(12) United States Patent
Peleg et al.

(10) Patent No.: US 7,805,152 B2
(45) Date of Patent: Sep. 28, 2010

(54) PTT ARCHITECTURE

(75) Inventors: Oren Peleg, Givat Shmuel (IL); Yuval Nissan, Modi'in (IL)

(73) Assignee: AudioCodes Ltd., Lod (IL)

( * ) Notice: Subject to any disclaimer, the term of this patent is extended or adjusted under 35 U.S.C. 154(b) by 655 days.

(21) Appl. No.: 11/819,218

(22) Filed: Jun. 26, 2007

(65) Prior Publication Data

US 2009/0004996 A1 Jan. 1, 2009

(51) Int. Cl.
*H04Q 7/20* (2006.01)

(52) U.S. Cl. .................... 455/518; 455/519; 455/414.4; 455/432.2; 455/90.2; 704/201

(58) Field of Classification Search ................ 455/518, 455/519, 403, 90.2, 552.1, 556.1, 127.4, 455/150.1, 414.4, 432.2; 370/352, 338, 466; 704/201, E19.1
See application file for complete search history.

(56) References Cited

U.S. PATENT DOCUMENTS

| | | | |
|---|---|---|---|
| 2002/0181446 A1* | 12/2002 | Preston et al. | 370/352 |
| 2006/0034260 A1* | 2/2006 | Svedberg et al. | 370/352 |
| 2006/0073843 A1* | 4/2006 | Aerrabotu et al. | 455/519 |
| 2006/0120350 A1 | 6/2006 | Olds et al. | |
| 2008/0171567 A1* | 7/2008 | Kossi et al. | 455/518 |

* cited by examiner

*Primary Examiner*—Tan Trinh
(74) *Attorney, Agent, or Firm*—Eitan Mehulal Law Group

(57) ABSTRACT

A communication system comprising: at least one first communication device configured to communicate in half duplex mode using a first encoding-decoding format; at least one second communication device configured to communicate in half duplex mode using a second encoding-decoding format; a third communication device configured to communicate in half duplex mode using the first format; a fourth communication device configured to communicate in half duplex mode using the second format; wherein the third and fourth communication devices are configured to communicate with each other in half duplex mode using a third encoding decoding format.

18 Claims, 3 Drawing Sheets

PTT ARCHITECTURE

FIELD OF THE INVENTION

The invention relates to push-to-talk communication networks.

BACKGROUND

Push-to-talk (PTT) communication is half duplex communication over a network configured to support communication between members of a group of users of the network in which each of the group can acquire exclusive status as a "sender" and transmit information in a multicast mode to all the others in the group. For convenience of presentation, a period of time during which the PTT communication takes place is referred to as a PTT session. A communication network or portion thereof configured to support a PTT session and participants of the session, are referred to as a PTT network and comprises at least two participants and generally more than two participants.

When a given participant of a PTT session has active status as a sender, the other participants of the PTT session are referred to as "listeners". Status as a sender during the session may generally be acquired by any of the PTT session participants at any time when no participant in the session is a sender by appropriately signaling the network. Once acquired, sender status is maintained until relinquished. Signaling to acquire sender status is obtained and maintained by appropriately operating a communication device configured to support PTT communication over the network. Usually, the communication device comprises a button, hereinafter a "PTT button", which a participant of the PTT session depresses to signal desire to acquire sender status, and maintains depressed to maintain sender status.

PTT communications using cellular mobile phones, conventionally known as Push-to-talk over cellular (PoC), is half duplex communication during a PTT session over a cellular phone network between participants, equipped with cellular phones, hereinafter "PoC phones", that are configured to provide, in addition to regular cellular phone communication, PTT communication over the cellular network. A cellular phone network or portion thereof configured to support a PTT session and participants of the session, are referred to as a PoC network and comprises at least two participants and generally more than two participants. The acronyms PoC and PTT may be used interchangeably hereinafter.

Typical of PoC communication, a participant becomes a sender, by merely pressing a PTT button on his or her PoC phone and acquires exclusive ability to transmit information, generally a voice message encoded in a suitable format for transmission, in a multicast mode to all the other participants of the PoC network. While a sender is transmitting, i.e. as long as the sender maintains his or her PTT button depressed, all the other PoC participants have status as listeners and cannot interrupt or transmit information to the sender or any of the other participants. A given sender relinquishes exclusive status as a sender when the sender releases his or her PTT button, thereby ending the given sender's transmission. After the given sender's transmission is ended, a first participant to press the PTT button on his or her mobile PoC phone acquires status as a sender with exclusive ability to transmit to all the other participants of the PTT session. This form of one-way half-duplex communication, contrasts with full-duplex communication, typical of cellular mobile communication and most forms of telephone communication, in which both the sender and the listener are able to transmit information to one another, or a third party, simultaneously.

In a typical PoC environment, all the participants in a PTT session use PoC phones equipped with a same type of CODEC (encoder/decoder) adapted to operate using a same voice encoding/decoding format. When a participant is a sender, the CODEC in the sender's PoC phone converts the sender's voice into signals, hereinafter "PTT signals", having a format, hereinafter a "PTT format", suitable for transmission over the PoC network. The CODEC in a listener's PoC phone that receives the senders PTT signals translates the PTT format back into voice.

Nevertheless, there may be PoC situations in which a sender and a listener are equipped with PoC phones comprising different types of CODECs, i.e. CODECs configured to use different types of coding/decoding PTT formats, so that the listener's PoC phone, also referred to as a receiver, does not "understand" the PTT format transmitted by the sender's PoC phone. As a result, the receiver is unable to translate the received PTT format into voice. Such situations can arise for example, when participants subscribing to different PoC network operators attempt to communicate in a PTT mode with each other.

To deal with such situations, some PoC networks have a network infrastructure comprising transcoders. The transcoders generally comprise relatively large Digital Signal Processing (DSP) equipment located at network gateways (communication exchange terminals), and are adapted to convert a PTT format used by a first CODEC into a different type of PTT format used by a second CODEC. A drawback to this approach is cost associated with using DSPs, which can be substantial for PoC networks involving large numbers of participants. Another approach is to fit a plurality of CODECs into participants' PoC phones, each CODEC capable of encoding/decoding a PTT format used by a different PoC network operator. Here again, the cost of fitting multiple CODECs in PoC phones for a large number of participants can be substantial.

Another approach to providing PTT communication between PoC phones equipped with different CODECs involves configuring the PoC phones with multiple decoders compatible with the different voice encoding formats of the different CODECs. Each such PoC phone comprises a single encoder and multiple decoders. Although it is generally less expensive to implement multiple decoders in the handsets rather than a plurality of "complete" CODECs, such a solution can also be expensive.

US Patent Publication 2006/0034260 A1, "Interoperability for Wireless User Devices with Different Speech Processing Formats," the disclosure of which is incorporated herein by reference, describes providing interoperability between wireless user devices using different CODECs. Interoperability is achieved by equipping communication devices with a plurality of decoders, each capable of decoding a different speech encoding format.

US Patent Publication 2006/0120350 A1, "Method and Apparatus Voice Transcoding in a VoIP Environment," the disclosure of which is incorporated herein by reference, describes a method for voice transcoding in a voice-over-internet-protocol (VoIP) environment comprising: receiving packets that include vocoder data frames in which source voice samples have been encoded according to a first vocoding format; decoding, by a decoder, the vocoder data frames to produce a sequence of linear speech samples; obtaining, by an encoder via a non-circuit switched communication path, linear speech samples from the sequence of linear speech samples produced by the decoder; and encoding, by the encoder, groups of speech samples from the sequence of linear speech samples to produce vocoder data frames according to a second vocoding format.

SUMMARY

An aspect of some embodiments of the invention relates to providing a method and a system for a relatively simple, improved configuration for providing push-to-talk (PTT) multicast communication using communication devices such as, for example, cellular mobile phones, that operate using different CODECS.

For convenience of presentation, one or more communication devices, and/or their users, using a same CODEC and configured to "participate" in a same PTT session using the CODEC are referred to as a PTT multicast group (PMG). A PTT session is a PTT communication session in which PTT communication devices of one or more PMGs communicate with each other, each different PMG having a different CODEC. Each communication device configured to participate in a PTT session is referred to as a PTT device.

In accordance with an aspect of an embodiment of the invention, a Virtual PTT Multicast Group (VPMG), provides PTT communication between PTT devices belonging to PMGs using different CODECs.

In accordance with an embodiment of the invention, the VPMG includes a virtual member associated with each PMG participating in the PTT session. The virtual members are configured to communicate with each other in a PTT mode using a same PTT format, hereinafter also referred to as a "VPMG format". A virtual member associated with a given PMG also communicates with all participants in its associated PMG in the PTT format peculiar to the associated PMG. Each virtual member comprises a transceiver or transcoder that receives voice signals from its associated PMG encoded in the PTT format of the CODEC of the associated PMG and retransmits the received encoded voice in the VPMG format to the other virtual members. The given virtual member also receives from other virtual members voice encoded in the VPMG format and retransmits the received encoded voice to its associated PMG in the PTT format of the CODEC of its associated PMG.

As a result of configuring a PTT session between participants having different CODECS by the implementation of a VPMG in accordance with an embodiment of the invention, a smaller number of transcoders, than are typically used in prior art are used to support the PTT communications. Optionally a single transcoder is used for each different CODEC in the PTT session. For example, to support a PoC session having 100 participants using three different CODECS, optionally only three transcoders are used.

It is noted that whereas the above discussion refers to transmission of voice signals over a PTT network, the invention is not limited to voice transmission and may includes any data formatted for transmission over the network. For example, in some embodiments of the invention SMSs and or multimedia streams are transmitted between participants of a PTT session in different PMGs. Furthermore, whereas participants in a PTT session in accordance with an embodiment of the invention are generally assumed to be operated by humans, participants may be unmanned automatic communication devices that communicate among themselves in a PTT mode.

There is therefore provided, in accordance with an embodiment of the invention, a communication system comprising: at least one first communication device configured to communicate in half duplex mode using a first encoding-decoding format; at least one second communication device configured to communicate in half duplex mode using a second encoding-decoding format; a third communication device configured to communicate in half duplex mode using the first format; a fourth communication device configured to communicate in half duplex mode using the second format; wherein the third and fourth communication devices are configured to communicate with each other in half duplex mode using a third encoding decoding format.

In some embodiments of the invention, at least one first communication device comprises a plurality of communication devices. In some embodiments of the invention the at least one second communication device comprises a plurality of communication devices.

In some embodiments of the invention, the at least one first communication device comprises a communication device configured to operate in a push to talk mode. In accordance with some embodiments of the invention, the at least one second communication device comprises a communication device configured to operate in a push to talk mode. In some embodiments of the invention, the third and fourth communication devices comprise communication devices configured to operate in a push to talk mode.

In some embodiments of the invention the at least one first communication device comprises at least one cell phone. According to some embodiments of the invention, the at least one second communication device comprises at least one cell phone. In some embodiments of the invention, the third and fourth communication devices comprise at least one cell phone.

BRIEF DESCRIPTION OF FIGURES

Examples illustrative of embodiments of the invention are described below with reference to figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

DETAILED DESCRIPTION OF EMBODIMENTS

Figure 1:
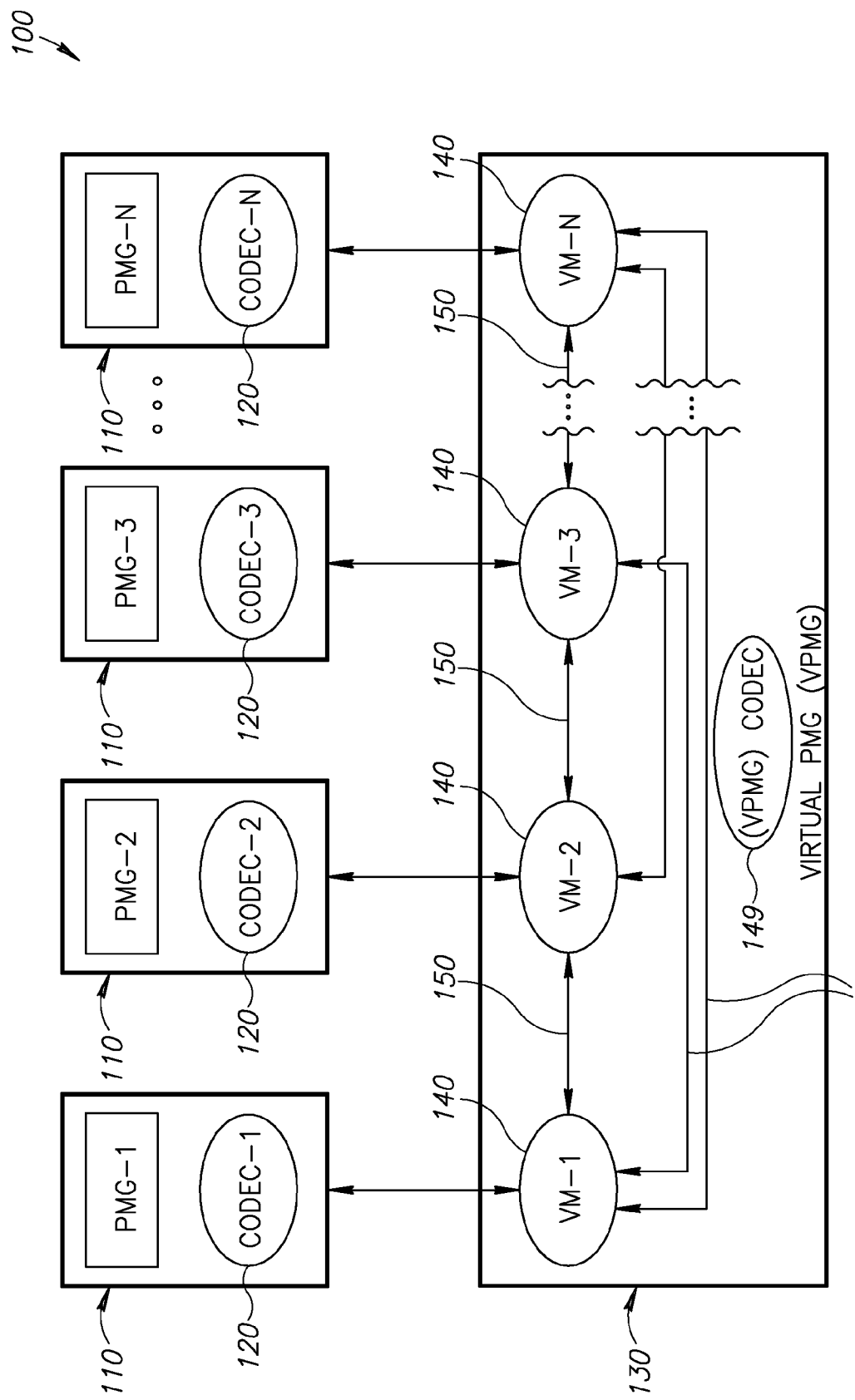
FIG. 1 schematically shows an exemplary Push-To-Talk (PTT) session comprising a virtual push to talk multicast group (VPMG) for use in PTT over cellular (PoC) applications, in accordance with an embodiment of the invention.

Reference is made to FIG. 1, which schematically shows an exemplary Push-To-Talk (PTT) network 100 for use in Push-To-Talk communication, in accordance with an embodiment of the invention. Push-To-Talk (PTT) network 100 is optionally a Push-To-Talk over cellular (PoC) network.

Exemplary PTT network 100, includes a plurality of "N" PTT Multicast Groups denoted PMG-1, PMG-2, PMG-3 ... PMG-N comprising CODECs CODEC-1, CODEC-2, CODEC-3 ... CODEC-N respectively. The PMG groups are referred to generically as PMGs 110 and the various CODECs are referred to generically as CODECs 120. Different CODECs 120, for example CODEC-1 and CODEC-2 use different coding/decoding schemes.

Each PMG of the plurality of PMGs 110, for example PMG-1, includes one or more PTT participants (not shown). Each participant in a same PMG 110 has a PTT communication device such as, for example, a cellular mobile handset, adapted for PTT communication comprising a same CODEC 120 peculiar to the PMG for encoding and decoding audio signals. Since all participants in a same PMG 110 use a same CODEC 120, they communicate with one another without having to translate, for example using a suitable transcoder, voice encoded in one CODEC format to voice encoded in a different CODEC format. However, since participants in different PMGs 110 use different CODECs 120, participants in one PMG 110 cannot communicate directly with participants belonging to a different PMG 110. It is noted, that whereas PTT participants in PMGs 110 are described as comprising a communication device, which is a cellular mobile phone, a PTT participant may of course use any communication device adapted for PTT communication and having a CODEC 120 for coding and decoding audio signals.

To provide for PTT communication, "cross-PMG communication", between participants in different PMGs 110, network 100 comprises a virtual PTT multicast group, VPMG 130, in accordance with an embodiment of the invention. VPMG 130 comprises a plurality of N virtual members (VMs) 140, individually distinguished by alphanumeric VM-1, VM-2, VM-3 . . . VM-N, one different virtual member VM 140 associated with each PMG 110. For example, VMs VM-1, VM-2, VM-3 . . . VM-N are associated respectively with PMG-1, PMG-2, PMG-3 . . . PMG-N. Virtual members VM 140 communicate with each other in a PTT mode using a common VPMG CODEC 149 for encoding and decoding transmissions in a common VPMG format. The common VPMG format is indicated by double arrowhead lines labeled 150 that connect VMs 140. VPMG format 150 may, for example, be a PTT format defined by the International Telecommunication Union (ITU-T) Standard such as G.711 or G.729, or defined by any other suitable communication protocol.

Each VM 140 in VPMG 130 comprises apparatus, such as an appropriate transceiver and/or transcoder, adapted to receive voice encoded in the format of the CODEC 120 of its corresponding associated PMG 110 and to retransmit the received encoded voice encoded by CODEC 149 in the common VPMG format 150 to other VMs 140 in VPMG 130. Each VM 140 is also adapted to receive from the other VMs 140 in VPMG 130, voice encoded in VPMG format 150 and to retransmit, using suitable apparatus, the received encoded voice to its associated PMG 110 in the format of the respective CODEC 120 of its associated PMG 110. By way of example, in exemplary network 100, VM-2 in VPMG 130 comprises a transceiver and/or other means for receiving and/or transmitting encoded voice in the PTT format, used by CODEC-2 comprised in its associated PMG-2. VM-2 is also adapted to retransmit encoded voice received in the CODEC-2 format to the other VMs 140, VM-1, VM-3 . . . VM-N, in VPMG format 150. VM-2 is further adapted to receive from VM-1, VM-3 . . . VM-N voice encoded in common VPMG format 150 and to retransmit to PMG-2 in CODEC-2 format.

It is noted that in FIG. 1, and in the description above, it is assumed that each VM 140 comprises a transceiver and/or transcoder for receiving, transmitting, decoding and encoding transmissions from and to PTT participants of its associated PMG 110. However, a suitable transceiver and/or transcoder associated with a given VM 140 is not necessarily comprised in the VM 140. The transceiver and/or transcoder may be configured using any of various suitable devices and/or methods known in the art and may be any suitable hardware and/or software device known in the art for receiving, transmitting, decoding and encoding transmissions that is separate from a VM 140.

The following is a description of how an optionally PoC communication session is conducted by PTT network 100, in accordance with an embodiment of the invention. A single PTT participant (not shown) in a given PMG 110 who wishes to talk and first sends a signal through the network is considered the sender. The signal may be initiated by a participant that, for example, presses on a button on the participant's cellular mobile phone (not shown) to initiate a PTT communication session. The signal is recognized by a PTT session manager (not shown), for example, a processor or processors in a PoC server (not shown), or a plurality of PoC servers, that support and manage PTT network 100. The PTT network manager assigns the participant originating the signal with the status of sender and VM 140 associated with the participant's PMG 110 is assigned the status of listener in the PMG but the status of sender in VPMG 130. All other participants in all the other PMGs 110 are assigned the status of listener. All VMs 140 in VPMG 130 other than the VM 140 associated with the sender's PMG 110 are assigned the status of listeners in the VPMG but also the status of senders in their respective associated PMGs 110. As long as the participant with the sender status maintains sender status, any voice message transmitted by the sender will in general be received by substantially all the participants in all PMGs 110.

For example, assume that the sender talks into his or her cell phone. The sender's phone encodes the vocal message in accordance with the PTT format of CODEC 120 of PMG 110 to which the sender belongs and transmits the encoded message. The encoded message is received by VM 140 associated with the sender's PMG 110 in VPMG 130, which is acting as listener in the sender's PMG 110. The associated VM 140, which also holds the status of sender in VPMG 130, retransmits the received encoded message "reformatted" in the VPMG PTT format. All the other VMs 140, which have listener status in VPMG 130, receive the VPMG formatted message and each reformats the received message in the format of its own associated PMG 110. Each of the other VMs 140, although being a listener in VPMG 130, is also a sender in its own associated PMG 110 and transmits the message it has reformatted to all the participants in its associated PMG. The participant's original vocal message is therefore transmitted via VPMG 130 to all participants in network 100.

Figure 2:
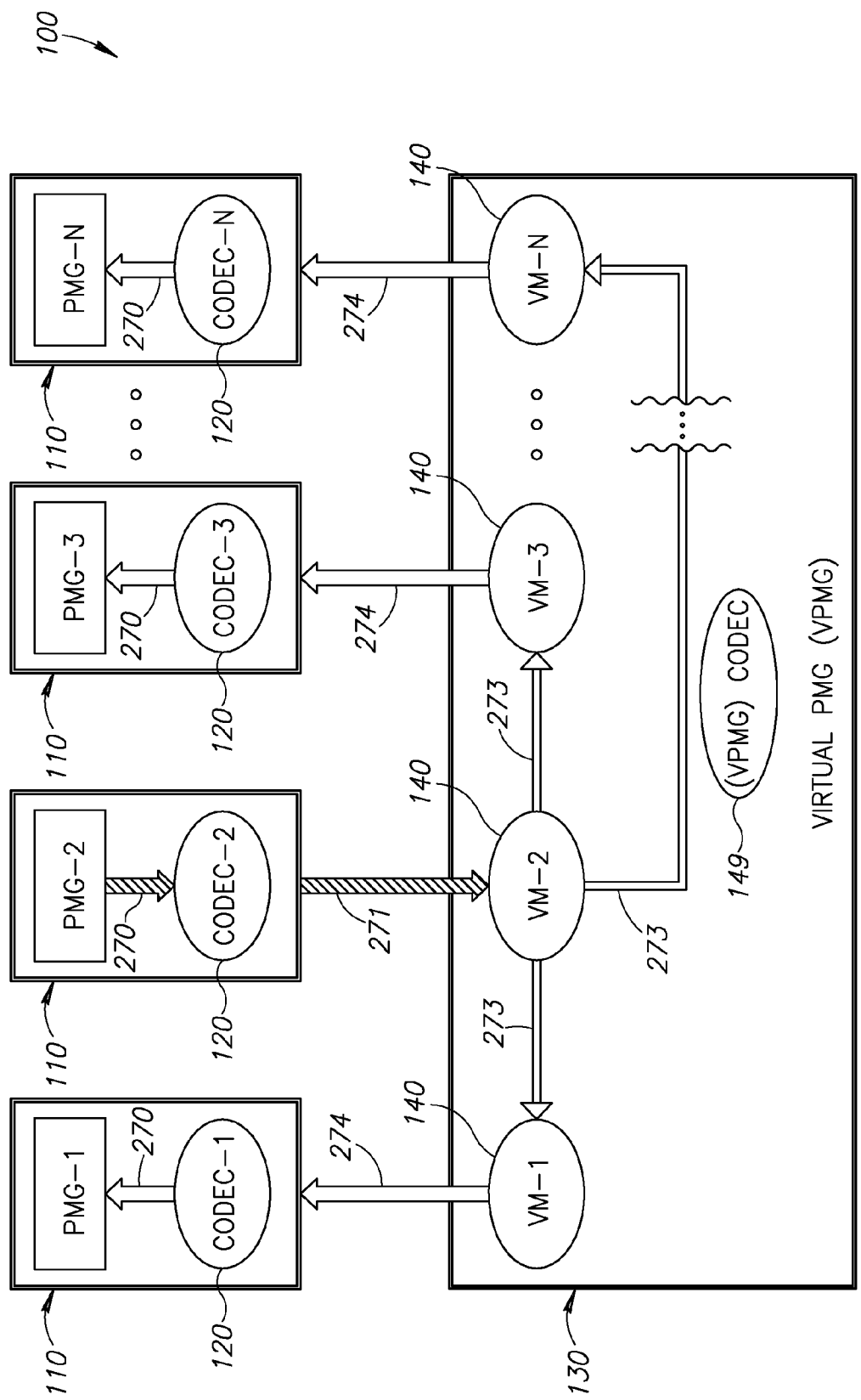
FIG. 2 schematically shows the VPMG comprised in the PTT network shown in FIG. 1 providing communication between participants in a PoC communication session, in accordance with an embodiment of the invention.

FIG. 2 schematically illustrates operation of PTT network 100 shown in FIG. 1, in which, by way of example, a participant (not shown) in PMG-2 initiates a communication session and transmits voice messages to listeners (not shown) in the different PMGs 110 comprised in the network, in accordance with an embodiment of the invention.

The PMG-2 participant initiates the communication session by being a first participant to signal in PTT network 100 during a time when no PTT communication session is in process. The participant in PMG-2 is assigned the status of sender. All other participants in PMG-1, PMG-2 . . . PMG-N are assigned the status of listeners, with only reception capabilities (receivers). VM-2 is assigned the status of listener in PMG-2, but the status of sender in VPMG 130. Each of the other VMs 140 in VPMG 130 is assigned the status of listener in the VPMG but the status of sender in its associated PMG 110. The sender in PMG-2 may now transmit encoded messages, optionally voice signals, represented by a bold, striped arrow 270, which are formatted by CODEC-2 in accordance with its PTT format as PTT signals represented by bold striped arrows 271. VM-2, previously assigned status as a listener in PMG-2 receives PTT signal 271. However, VM-2 is also a sender in VPMG 130 and it retransmits the signal to all VMs 140 in VPMG 130 in VPMG format 150 (FIG. 1) as PTT signals 273. VM-1, VM-3, VM-4 . . . VM-N, previously designated as VPMG listeners in VPMG 130 receive PTT signals 273 and convert the received signals to signals 274 formatted in the PTT formats of CODEC-1, CODEC-3, CODEC-4 . . . CODEC-N respectively. Each VM-1, VM-3, VM-4 . . . VM-N is a sender in its associated PMG; PMG-1, PMG-3, PMG-4 . . . PMG-N and transmits the signals it converts to participants in its associated PMG; PMG-1, PMG-3, PMG-4 . . . PMG-N. Each participant in PMGs 140 therefore receives a signal 274 that is understood by the CODEC in the participant's cell phone and is able to hear the original message sent by the sender in PMG-2.

It is noted that implementation of VPMG 130 may be in one or more server-level PoC network processors. Furthermore, according to some embodiments of the invention, a plurality of VPMGs may be implemented in one or more server level PoC network processors and/or in different configurations. For example, VPMGs can be nested, in accordance with an embodiment of the invention, with at least one PMG itself comprising a VPMG and coupled to other PMGs by a VPMG in a PTT communication network similar to PTT communication network 100.

Figure 3:
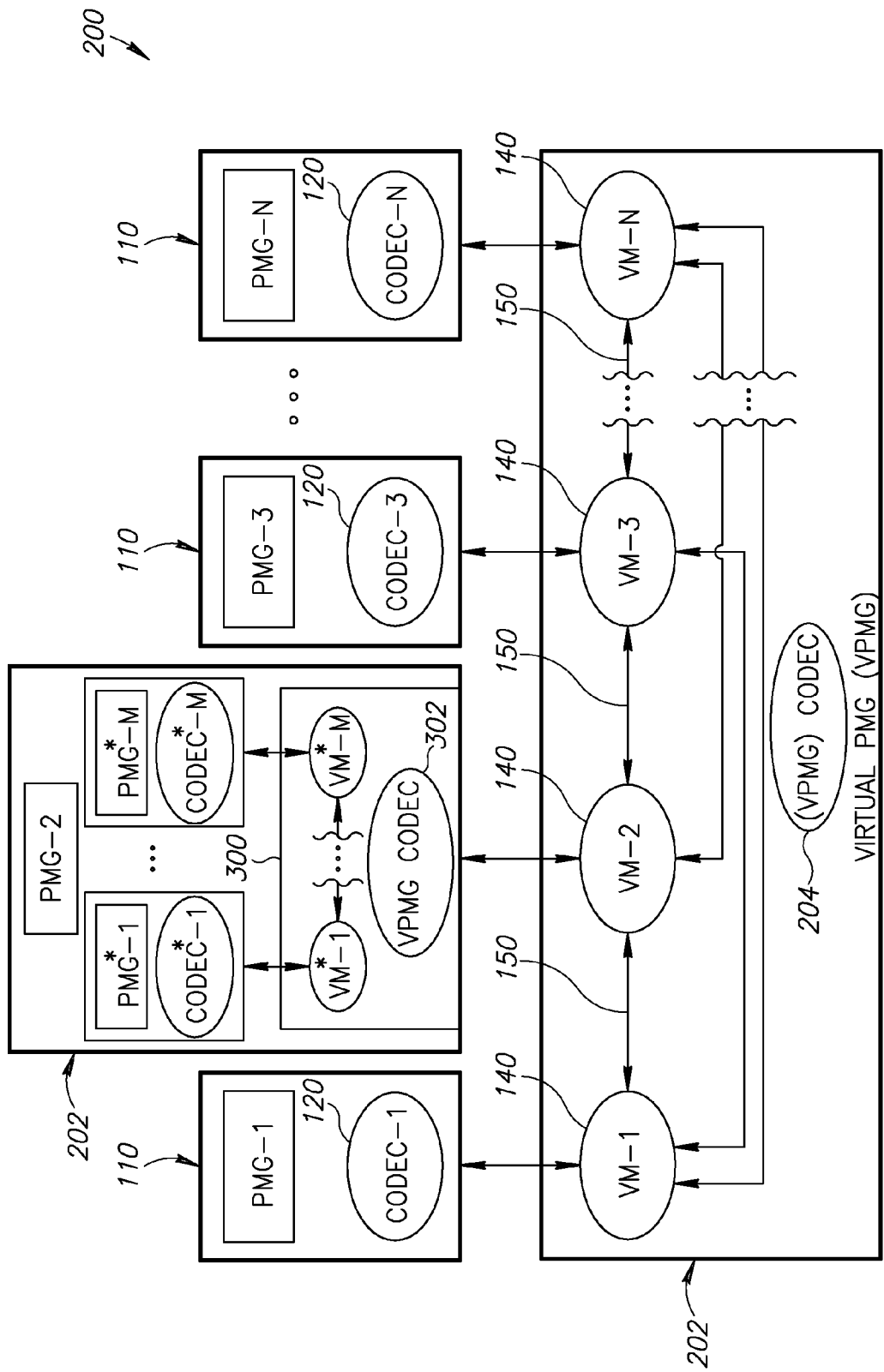
FIG. 3 schematically shows a PTT communication network 200 comprising nested VPMGs in accordance with an embodiment of the invention.

FIG. 3 schematically shows a PTT communication network 200 comprising nested VPMGs in accordance with an embodiment of the invention. PTT communication network 200 comprises a plurality of PMGs, PMG-1 . . . PMG-N that are coupled to each other by a VPMG 202, similar to VPMG 130 (FIG. 1). VPMG 202 comprises a VPMG CODEC 204 and virtual members VM-1 . . . VM-N associated respectively with PMG-1 . . . PMG-N. However, at least one of PMGs 110 in PTT network 200, itself comprises a VPMG. By way of example, in PTT network 200, PMG-2 comprises a VPMG 300 that couples a plurality of PMGs, PMG*-1 . . . PMG*-M having CODECs, CODEC*-L . . . CODEC*-M respectively in a PTT communication network. VPMG 300 has a VPMG CODEC 302 for encoding messages communicated between its virtual members VM*-1 . . . VM*-M. VM-2 in VPMG 202 couples VPMG 300 to PMGs, PMG-1, PMG-3 . . . PMG-N in PTT communication network 200 similar to the manner in which VPMG 130 couples PMGs 10 in communication network 100. VM-2 receives and transmits messages from and to VPMG 300 in the format of VPMG CODEC 302 and receives and transmits messages to VM-1, VM-3 . . . VM-N in the format of VPMG CODEC 204.

In the description and claims of embodiments of the present invention, each of the words, "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art. The scope of the invention is limited only by the claims.

The invention claimed is:

1. A system for Push-To-Talk (PTT) communication over cellular network, the system comprising:
    a first PTT multicast group comprising one or more PTT-capable communication devices configured to communicate in half duplex PTT mode using a first PTT encoding-decoding format supported by coders-encoders of the PTT-capable communication devices of the first PTT multicast group;
    a second PTT multicast group comprising one or more other PTT-capable communication devices configured to communicate in half duplex PTT mode using a second PTT encoding-decoding format supported by coders-encoders of the PTT-capable communication devices of the second PTT multicast group;
    wherein the system further comprises virtual PTT multicast group comprising a first network element and a second network element configured to communicate in half duplex PTT mode using a third PTT encoding-decoding format,
    wherein the first network element is: (a) to receive, as listener in the first PTT multicast group, a PTT vocal message encoded in the first PTT encoding-decoding format; (b) to transcode the PTT vocal message from the first PTT encoding-decoding format to the third PTT encoding-decoding format; (c) to transmit, as sender in the virtual PTT multicast group, the PTT vocal message encoded in the third PTT encoding-decoding format, to the second network element;
    wherein the second network element is: (a) to receive, as listener in the virtual PTT multicast group, the PTT vocal message encoded in the third PTT encoding-decoding format; (b) to transcode the PTT vocal message from the third PTT encoding-decoding format to the second PTT encoding-decoding format; (c) to transmit, as sender in the second PTT multicast group, the PTT vocal message encoded in the second PTT encoding-decoding format.

2. The system of claim 1, wherein the first network element is a virtual participant in the first PTT multicast group which operates as listener and which operates to retransmit transcoded PTT vocal messages without initiating original PTT vocal messages.

3. The system of claim 1, wherein, upon initiation of the PTT vocal message in the first PTT multicast group, (a) the first network element is assigned a listener status in the first PTT multicast group, (b) the first network element is assigned a sender status in the virtual PTT multicast group, (c) the second network element is assigned a listener status in the virtual PTT multicast group, and (d) the second network element is assigned a sender status in the second PTT multicast group.

4. The system of claim 3, wherein, upon initiation of a PTT vocal message in the second PTT multicast group, (a) the second network element is assigned a listener status in the second PTT multicast group, (b) the second network element is assigned a sender status in the virtual PTT multicast group, (c) the first network element is assigned a listener status in the virtual PTT multicast group, and (d) the first network element is assigned a sender status in the first PTT multicast group.

5. The system of claim 1, wherein the first PTT multicast group comprises two or more PTT-capable communication devices that are limited to internally decoding PTT vocal messages encoded in the first PTT encoding-decoding format;
    wherein the second PTT multicast group comprises two or more other PTT-capable communication devices that are limited to internally decoding PTT vocal messages encoded in the second PTT encoding-decoding format.

6. The system of claim 1, wherein the two or more PTT-capable communication devices of the second PTT multicast group are able to decode the vocal message initiated in the first PTT multicast group after said vocal message is (a) transcoded by the first network element from the first PTT encoding-decoding format to the third PTT encoding-decoding format which is supported by the first and second network elements, and (b) transcoded by the first network element from the third PTT encoding-decoding format to the second PTT encoding-decoding format supported by the second PTT multicast group.

7. The system of claim 1, wherein the first network element comprises a first transcoder to transcode the PTT vocal message from the first PTT encoding-decoding format to the third PTT encoding-decoding format; and wherein the second network element comprises a second transcoder to transcode the PTT vocal message from the third PTT encoding-decoding format to the second PTT encoding-decoding format.

8. The system of claim 1, wherein the first PTT encoding-decoding format is substantially unsupported by coders-encoders of the PTT-capable communication devices of the second PTT multicast group;
wherein the second PTT encoding-decoding format is substantially unsupported by coders-encoders of the PTT-capable communication devices of the first PTT multicast group.

9. The system of claim 1, wherein the first network element operates as listener in the first PTT multicast group;
wherein the first network element operates as sender in the virtual PTT multicast group;
wherein the second network element operates as listener in the virtual PTT multicast group;
wherein the second network element operates as sender in the second PTT multicast group.

10. A method for Push-To-Talk (PTT) communication over cellular network, the method comprising:
associating a first network element with a first PTT multicast group, wherein the first PTT multicast group comprises one or more PTT-capable communication devices configured to communicate in half duplex PTT mode using a first PTT encoding-decoding format supported by coders-encoders of the PTT-capable communication devices of the first PTT multicast group;
associating a second network element with a second PTT multicast group, wherein the second PTT multicast group comprises one or more other PTT-capable communication devices configured to communicate in half duplex PTT mode using a second PTT encoding-decoding format supported by coders-encoders of the PTT-capable communication devices of the second PTT multicast group;
wherein the method further comprises:
establishing a virtual PTT multicast group comprising said first network element and said second network element;
configuring the first and second network elements to communicate between themselves in half duplex PTT mode using a third PTT encoding-decoding format;
configuring the first network element: (a) to receive, as listener in the first PTT multicast group, a PTT vocal message encoded in the first PTT encoding-decoding format; (2) to transcode the PTT vocal message from the first PTT encoding-decoding format to the third PTT encoding-decoding format; (3) to transmit, as sender in the virtual PTT multicast group, the PTT vocal message encoded in the third PTT encoding-decoding format, to the second network element;
configuring the second network element: (a) to receive, as listener in the virtual PTT multicast group, the PTT vocal message encoded in the third PTT encoding-decoding format; (2) to transcode the PTT vocal message from the third PTT encoding-decoding format to the second PTT encoding-decoding format; (3) to transmit, as sender in the second PTT multicast group, the PTT vocal message encoded in the second PTT encoding-decoding format.

11. The method of claim 10, wherein the first network element is a virtual participant in the first PTT multicast group which operates as listener and which operates to retransmit transcoded PTT vocal messages without initiating original PTT vocal messages.

12. The method of claim 10, wherein, upon initiation of the PTT vocal message in the first PTT multicast group, (a) the first network element is assigned a listener status in the first PTT multicast group, (b) the first network element is assigned a sender status in the virtual PTT multicast group, (c) the second network element is assigned a listener status in the virtual PTT multicast group, and (d) the second network element is assigned a sender status in the second PTT multicast group.

13. The method of claim 12, wherein, upon initiation of a PTT vocal message in the second PTT multicast group, (a) the second network element is assigned a listener status in the second PTT multicast group, (b) the second network element is assigned a sender status in the virtual PTT multicast group, (c) the first network element is assigned a listener status in the virtual PTT multicast group, and (d) the first network element is assigned a sender status in the first PTT multicast group.

14. The method of claim 10, wherein the first PTT multicast group comprises two or more PTT-capable communication devices that are limited to internally decoding PTT vocal messages encoded in the first PTT encoding-decoding format;
wherein the second PTT multicast group comprises two or more other PTT-capable communication devices that are limited to internally decoding PTT vocal messages encoded in the second PTT encoding-decoding format.

15. The method of claim 14, wherein the two or more PTT-capable communication devices of the second PTT multicast group are able to decode the vocal message initiated in the first PTT multicast group after said vocal message is (a) transcoded by the first network element from the first PTT encoding-decoding format to the third PTT encoding-decoding format which is supported by the first and second network elements, and (b) transcoded by the second network element from the third PTT encoding-decoding format to the second PTT encoding-decoding format supported by the second PTT multicast group.

16. The method of claim 10, wherein the first network element comprises a first transcoder to transcode the PTT vocal message from the first PTT encoding-decoding format to the third PTT encoding-decoding format; and wherein the second network element comprises a second transcoder to transcode the PTT vocal message from the third PTT encoding-decoding format to the second PTT encoding-decoding format.

17. The method of claim 10, wherein the first PTT encoding-decoding format is substantially unsupported by coders-encoders of the PTT-capable communication devices of the second PTT multicast group;

wherein the second PTT encoding-decoding format is substantially unsupported by coders-encoders of the PTT-capable communication devices of the first PTT multicast group.

18. The method of claim 10, comprising:

configuring the first network element to operate as listener in the first PTT multicast group;

configuring the first network element to operate as sender in the virtual PTT multicast group;

configuring the second network element to operate as listener in the virtual PTT multicast group;

configuring the second network element to operate as sender in the second PTT multicast group.

* * * * *